UNITED STATES PATENT OFFICE.

GREEN F. WHISENANT, OF CHAPEL HILL, TEXAS.

IMPROVEMENT IN COMPOUNDS FOR DESTROYING CATERPILLARS.

Specification forming part of Letters Patent No. 134,959, dated January 14, 1873.

*To all whom it may concern:*

Be it known that I, GREEN F. WHISENANT, of Chapel Hill, in the county of Washington and State of Texas, have invented a new and useful Compound for Destroying Caterpillars on the Cotton-Plant; and I do hereby declare the following to be a full and exact description of the same.

The compound is made up of the following ingredients, viz: Paris green, one-quarter pound; arsenic, one pound; lime, twenty pounds; flour, five pounds.

These ingredients are mechanically mixed and sprinkled upon the plant. The function of the Paris green, flour, and lime is to cause the arsenic with which they are mixed to stick to the plant, so as to be eaten by the caterpillar, and thus cause its destruction.

Having thus described my invention, what I claim is—

The compound of Paris green, arsenic, lime, and flour, herein described, for the purpose set forth.

GREEN F. WHISENANT.

Witnesses:
JEFFERSON BASSETT,
B. H. BASSETT,
JOHN SAYLES.